(12) United States Patent
Matsuura et al.

(10) Patent No.: US 6,853,747 B1
(45) Date of Patent: Feb. 8, 2005

(54) IMAGE PROCESSING METHOD AND APPARATUS AND RECORDING MEDIUM

(75) Inventors: Takahiro Matsuura, Yokohama (JP); Takeshi Makita, Kawasaki (JP); Osamu Yamada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/317,844

(22) Filed: May 25, 1999

(30) Foreign Application Priority Data

May 26, 1998 (JP) .......................................... 10-144254
May 19, 1999 (JP) .......................................... 11-138543

(51) Int. Cl.[7] .................................................. G06K 9/00
(52) U.S. Cl. ..................................... 382/167; 382/162
(58) Field of Search .............................. 382/167, 162, 382/266; 358/518–523, 1.9, 527; 345/600, 601, 156

(56) References Cited

U.S. PATENT DOCUMENTS

| | | | |
|---|---|---|---|
| 4,717,999 A | | 1/1988 | Kaneko ...................... 346/160 |
| 4,931,864 A | | 6/1990 | Kawamura et al. ........... 358/80 |
| 5,140,414 A | * | 8/1992 | Mowry ....................... 348/577 |
| 5,374,954 A | * | 12/1994 | Mowry ....................... 348/121 |
| 5,457,491 A | * | 10/1995 | Mowry ....................... 348/104 |
| 5,502,580 A | | 3/1996 | Yoda et al. .................. 358/518 |
| 5,543,855 A | | 8/1996 | Yamada et al. ............. 348/753 |
| 5,646,750 A | * | 7/1997 | Collier ....................... 358/518 |
| 5,687,011 A | * | 11/1997 | Mowry ....................... 358/527 |
| 5,982,416 A | | 11/1999 | Ishii et al. ..................... 348/29 |
| 6,118,455 A | * | 9/2000 | Hidaka et al. ............... 345/589 |
| 6,122,006 A | * | 9/2000 | Bogdanowicz et al. .. 348/222.1 |
| 6,124,944 A | * | 9/2000 | Ohta .......................... 358/1.9 |
| 6,225,974 B1 | * | 5/2001 | Marsden et al. ............ 345/590 |
| 6,269,217 B1 | * | 7/2001 | Rodriguez .................. 386/46 |
| 6,320,980 B1 | | 11/2001 | Hidaka ....................... 382/167 |

FOREIGN PATENT DOCUMENTS

| | | |
|---|---|---|
| EP | 0 660 589 | 6/1995 |
| EP | 0 706 285 | 4/1996 |
| EP | 0 812 104 | 12/1997 |
| JP | 2-210966 | 8/1990 |
| JP | 7-154623 | 6/1995 |
| JP | 8-37603 | 2/1996 |
| JP | 8-256273 | 10/1996 |
| JP | 9-98300 | 4/1997 |
| JP | 9-149244 | 6/1997 |
| JP | 9-238265 | 9/1997 |

OTHER PUBLICATIONS

Machine Translation of JP 09–326943 (OTA), Dec. 16, 1997.*
Furukawa et al, Super high definition image digitizing system, IEEE International Conference on Acoustics, Speech, and Signal Processing, Mar. 23–26, 1992, vol. 3, p. 529–532.*
European Search Report (Ref. No. 2660630) (Dated Nov. 7, 2000).
Official Action dated May 19, 2004; Japanese Patent Application No. 11-138543.

* cited by examiner

Primary Examiner—Von J. Couso
(74) Attorney, Agent, or Firm—Fitzpatrick, Cella, Harper & Scinto

(57) ABSTRACT

Disclosed is an image processing method.

According to the present invention, an image processing method comprises the steps of retaining on file a profile for an input device and a profile for an output target film, employing the profiles for the input device and for the output target film to prepare a color reproduction table to facilitate the input of image data that is near that of the output target film, and correcting the colors of the input image data in accordance with the table that is prepared.

10 Claims, 19 Drawing Sheets

FIG. 3

| TYPE OF INPUT DEVICE | | PATCH 1 | PATCH 2 | LUMINANCE<br>PATCH 3 | PATCH 4 | ...... |
|---|---|---|---|---|---|---|
| INPUT DEVICE A | R COMPONENT | ## | ## | ## | ## | ## |
| | G COMPONENT | ## | ## | ## | ## | ## |
| | B COMPONENT | ## | ## | ## | ## | ## |
| INPUT DEVICE B | R COMPONENT | ## | ## | ## | ## | ## |
| | G COMPONENT | ## | ## | ## | ## | ## |
| | B COMPONENT | ## | ## | ## | ## | ## |
| INPUT DEVICE C | R COMPONENT | ## | ## | ## | ## | ## |
| | G COMPONENT | ## | ## | ## | ## | ## |
| | B COMPONENT | ## | ## | ## | ## | ## |

INPUT DEVICE WHICH IS BEING SELECTED

FIG. 4

| TYPE OF OUTPUT TARGET FILM | | PATCH 1 | PATCH 2 | LUMINANCE<br>PATCH 3 | PATCH 4 | ⋯ |
|---|---|---|---|---|---|---|
| FILM A | R COMPONENT | ## | ## | ## | ## | ## |
| | G COMPONENT | ## | ## | ## | ## | ## |
| | B COMPONENT | ## | ## | ## | ## | ## |
| FILM B | R COMPONENT | ## | ## | ## | ## | ## |
| | G COMPONENT | ## | ## | ## | ## | ## |
| | B COMPONENT | ## | ## | ## | ## | ## |
| FILM C | R COMPONENT | ## | ## | ## | ## | ## |
| | G COMPONENT | ## | ## | ## | ## | ## |
| | B COMPONENT | ## | ## | ## | ## | ## |

↖ FILM WHICH IS BEING SELECTED

LUT FOR CORRECTING COLOR FOG AND CONTRAST

LUT FOR DIGITAL DEVELOPMENT

FIG. 21

| PIXEL | R VALUE | G VALUE | B VALUE |
|---|---|---|---|
| IMG[0] | ## | ## | ## |
| IMG[1] | ## | ## | ## |
| IMG[2] | ## | ## | ## |
| IMG[3] | ## | ## | ## |
| IMG[4] | ## | ## | ## |
| IMG[5] | ## | ## | ## |
| IMG[6] | ## | ## | ## |
| IMG[7] | ## | | |
| .. | | | ## |
| IMG[n] | ## | ## | |
| .. | | | |

IMAGE DATA

| ### |
|---|
| INPUT DEVICE ID |

IMAGE HEADER

IMAGE PROCESSING METHOD AND APPARATUS AND RECORDING MEDIUM

BACKGROUND OF THE INVENTION

1. Field of the Invention

The present invention relates to an image processing method and apparatus, for correcting an image, and to a recording medium.

2. Related Background Art

Various algorithms have been proposed for use in correcting the highlighting, shadow, contrast and white balance for an image recorded by a digital camera.

However, even when adjustments are made for highlighting, shadow, contrast and white balance, the image quality provided by a digital camera that faithfully reproduces the color of an object is not as satisfactory as is the image quality provided by silver halide photography.

This is true because with silver halide film desired colors are reproduced. That is, so-called memory colors in particular, such as the colors of skin, the sky, and glass, are not always faithfully reproduced, but rather, color tones are shifted and colors are reproduced in accordance with individual preferences. Such color tone shifting is performed for images recorded using silver halide film.

SUMMARY OF THE INVENTION

It is, therefore, one objective of the present invention to provide a method whereby, to reproduce preferred colors, corrections are made to an image recorded using a specific input device so that the tones and colors of the image more nearly correspond to those that would be produced using silver halide film.

To achieve the above objective, according to a first aspect of the present invention, an image processing method comprises the steps of:

holding a profile for an input device and a profile for an output target film;

preparing a table to approximate a color reproducibility of an output target film as to a color reproducibility of input image data on the basis of the profile for the input device and the profile for the output target film; and correcting the color of the input image data by using the prepared table.

According to a second aspect of the present invention, an image processing method comprises the steps of:

correcting a color of input image data by using a table prepared on the basis of a color reproducibility for input image data and a color reproducibility for an output target; and emphasizing an edge of a highlighted portion of the image data obtained by color correction.

Objectives and advantages other than those discussed above will become apparent to those skilled in the art during the course of the description of the preferred embodiments of the invention that follows. In the description, reference is made to accompanying drawings, which form a part thereof and which illustrate an example of the invention. Such a description, however, is not an exhaustive recital of the various possible embodiments of the invention, and reference is therefore made to the claims that follow the description for a determination of the scope of the invention.

BRIEF DESCRIPTION OF THE DRAWINGS

FIG. 3 is a diagram showing data held in an input device profile holding unit;

FIG. 4 is a diagram showing data held in an output target film profile holding unit;

FIG. 21 is a diagram showing image data and an image header stored in an image buffer;

DETAILED DESCRIPTION OF THE PREFERRED EMBODIMENTS

The preferred embodiments of the present invention will now be described while referring to the accompanying drawings.

(First Embodiment)

Figure 1:
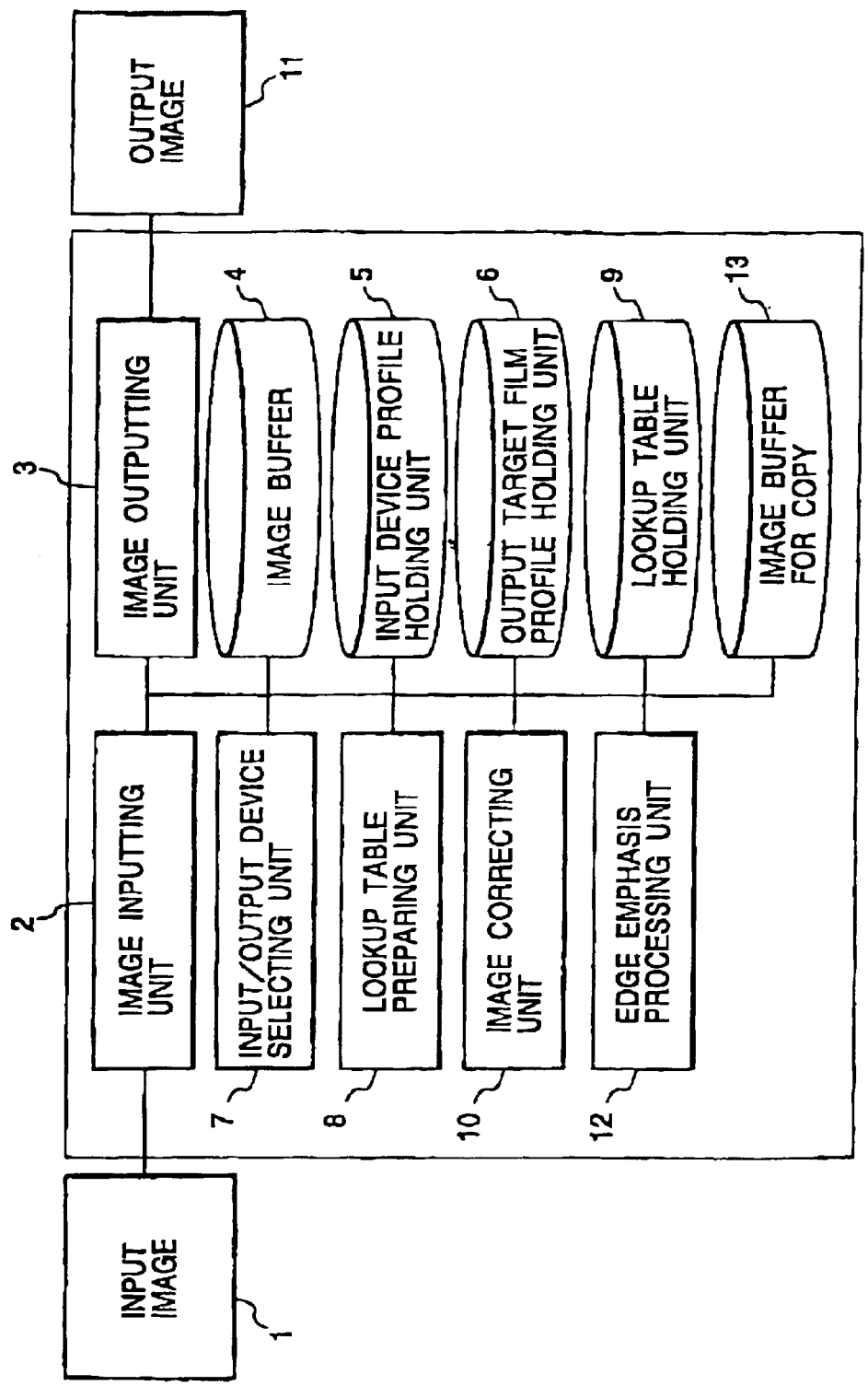
FIG. 1 is a diagram illustrating the arrangement of an image correction apparatus according to a first embodiment of the present invention.

FIG. 1 is a diagram showing the arrangement of the essential portion of an image correction apparatus according to a first embodiment of the present invention.

The image correction apparatus in FIG. 1 comprises: an image inputting unit 2, an image outputting unit 3, an image buffer 4, an input device profile holding unit 5, an output target film profile holding unit 6, an input/output device selecting unit 7, a lookup table preparing unit 8, a lookup table holding unit 9, an image correcting unit 10, an edge emphasis processing unit 12, and an image buffer 13 for copy.

The image inputting unit 2 reads data from an input image 1, and writes the data in the image buffer 4. The image outputting unit 3 writes, as an output image, the data stored in the image buffer 4 wherein the image data are held. The input device profile holding unit 5 holds profiles for several types of input devices and for an input device that is currently being selected. The output target film profile holding unit 6 holds profiles for several types of films to be output and an output film that is currently being selected. The input/output device selecting unit 7 selects an input device and stores the selected input device type in the input device profile holding unit 5, and selects an output target film and stores the selected film type in the output target film profile holding unit 6. The lookup table preparing unit 8 prepares a lookup table by employing the data stored in the input device profile holding unit 5 and in the output target film profile holding unit 6, and stores the lookup table in the lookup table holding unit 9. Based on the lookup table held in the lookup table holding unit 9, the image correcting unit 10 corrects image data stored in the image buffer 4. The edge emphasis processing unit 12 emphasizes the edge of a highlighted portion. The image buffer 13 used for copy is used for the temporarily storage of a copy of the image data held in the image buffer 4 when the edge emphasis processing is performed.

The operation of the image correction apparatus can be implemented by supplying to a personal computer, for example, a program for performing, or for exercising control of the operations of the individual sections. In this case, the CPU of the personal computer performs, or exercises control of the individual section operations based on the contents of the supplied program.

The first embodiment of the present invention will now be described in detail by employing a specific example.

Figure 2:
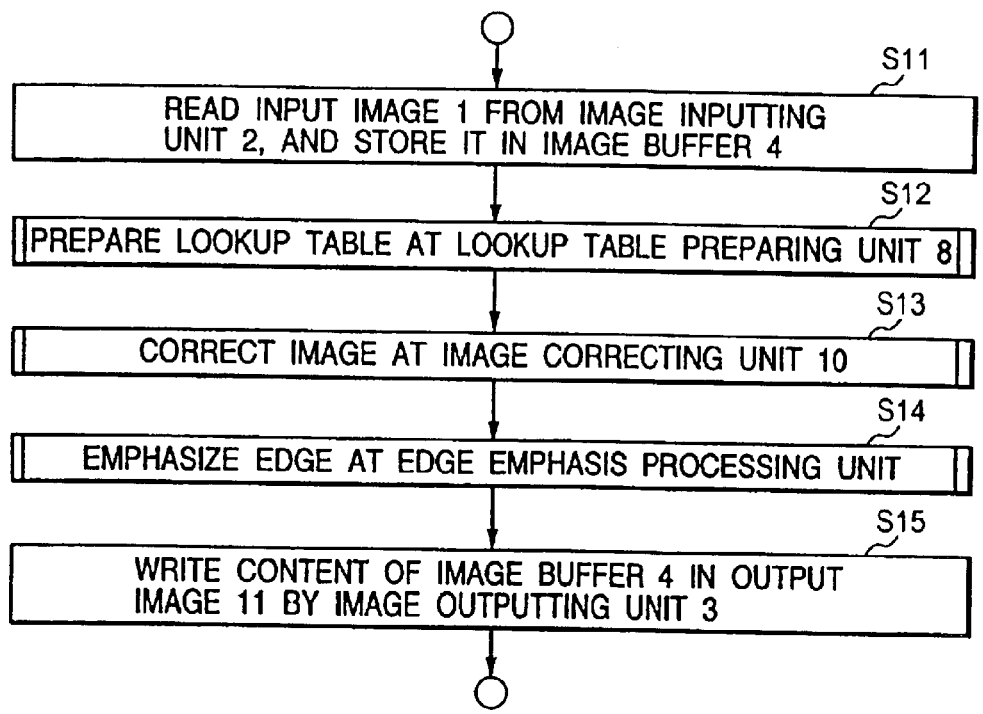
FIG. 2 is a flowchart showing the processing according to the first embodiment of the present invention.

FIG. 2 is a flowchart showing the processing for the first embodiment.

At step S11, an input image is read from the image inputting unit 2, and the image data are stored in the image buffer 4.

At step S12, the lookup table preparing unit 8 prepares a lookup table. The detailed operation of the lookup table preparing unit 8 will be described later while referring to FIG. 5.

At S13, the image correcting unit 10 corrects an image. The detailed operation of the image correcting unit 10 will be described later while referring to FIG. 7.

At step S14 the edge emphasis processing unit 12 performs an operation to emphasize the edge of a highlighted portion. The detailed operation performed by the edge emphasis processing unit 12 will be described later while referring to FIG. 11.

At step S15 the contents of the image buffer 4 are written to the output image buffer 11 by the image outputting unit 3.

FIG. 3 is a diagram showing the data structure of an input device profile held in the input device profile holding unit 5.

The input device profile has a two-dimensional data structure that consists of the patch numbers of individual gray scales, and the corresponding RGB values of input devices. When the number of input device types is increased, only the RGB values for individual patches of corresponding gray scales need be measured and added to the table.

The type of device that is currently being selected is also held in the input device profile holding unit 5. This device type can be changed by the input/output device selecting unit 7. In the initial state, any one of the devices is selected.

FIG. 4 is a diagram showing the data structure of an output target film profile that is held in the output target film profile holding unit 6.

The output target film profile has a two-dimensional data structure that consists of the number of patches of gray scales and the corresponding RGB values of output target films. When the number of output target film types is increased, only the RGB values for the patches corresponding to the gray scales need be measured and added to the profile.

The type of film that is currently being selected is also held in the film profile holding unit 6. The film type can be changed by the input/output device selecting unit 7. In the initial state, any one of the film types is selected.

Figure 10:
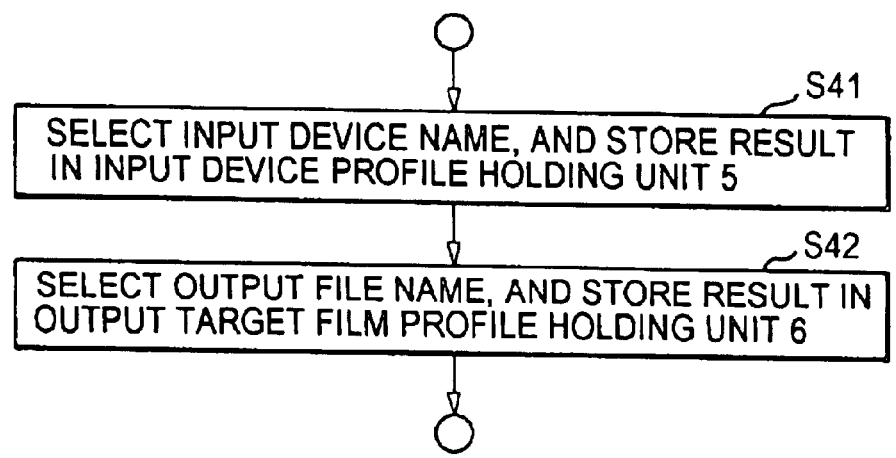
FIG. 10 is a flowchart showing the processing performed by an output device selecting unit.

The operation performed by the input/output device selecting unit 7 is shown in FIG. 10.

At step S41, the name of an input device is selected and is stored in the input device profile holding unit 5. When, for example, a profile conforming to the ICC standard is added to the input image data, the name of the input device is automatically selected based on the header information for the profile. When a profile is not added to the input image data, the name of the input device is selected based on an instruction issued by a user that is entered at a user interface that is unique to the image correction apparatus of the present invention and that is displayed on the monitor of a personal computer.

At step S42, the name of an output film is selected and is stored in the output target film profile holding unit 6. As the name of the output film, the name of an output device is selected based on an instruction issued by a user that is entered at a user interface that is unique to the image correction apparatus of the present invention.

The name of an input device and the name of an output film can be selected at any time, except during the correction processing.

Figure 5:
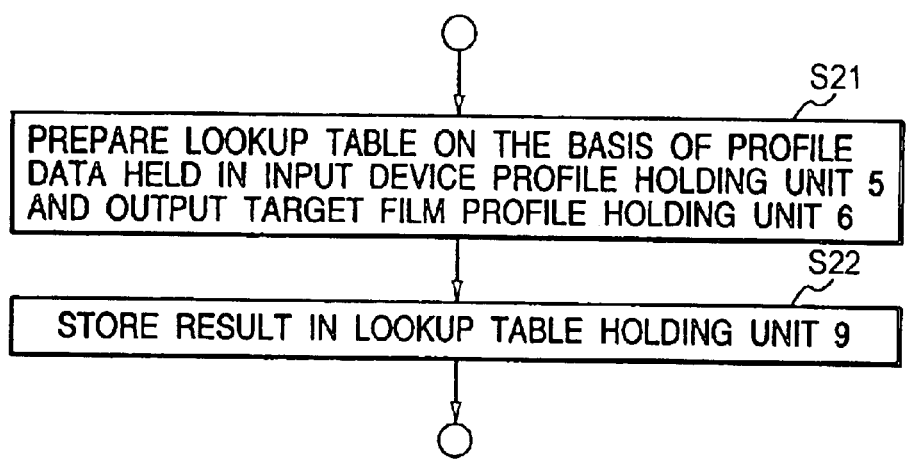
FIG. 5 is a flowchart showing the processing performed by a lookup table preparing unit.

The operation performed by the lookup table preparing unit 8 is shown in FIG. 5, which is a detailed diagram of the operation performed at step S12 in FIG. 2.

Figure 6:
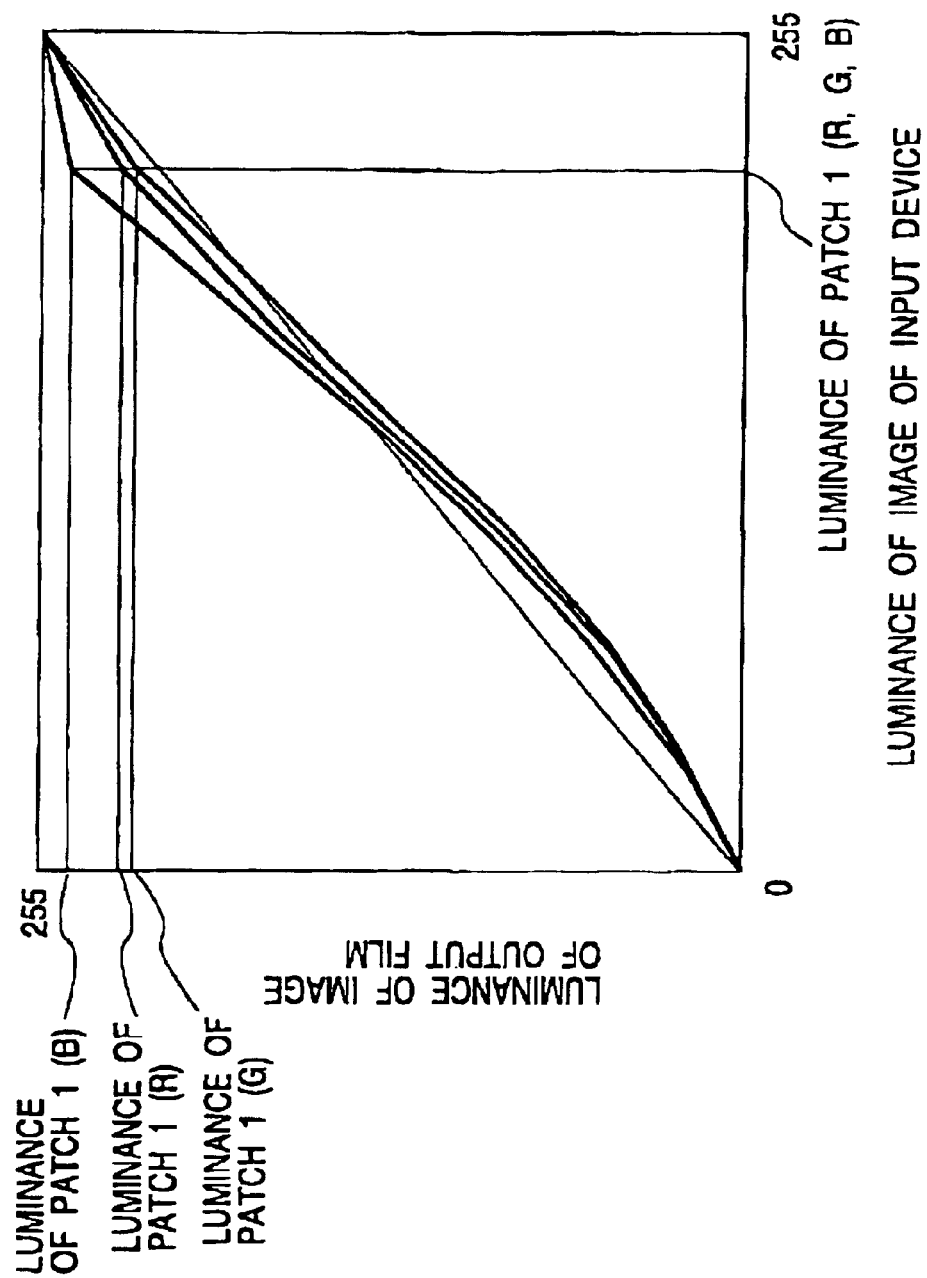
FIG. 6 is a diagram showing an example lookup table held in a lookup table holding unit.

At step S21, a one-dimensional lookup table for individual RGB color components is prepared based on the input device profile and the output target film profile that are selected by the input/output device selecting unit 7. In this embodiment, a lookup table shown in FIG. 6 is prepared with which input device profile data corresponding to the same patch are converted into data for the output target film profile. The individual points at which data are not stored in the profile are linearly interpolated with each other, and conversion data are prepared. At both ends, points (255, 255) and (0, 0) are linearly interpolated. Although linear interpolation is employed for this embodiment, non-linear interpolation using a spline curve or a Bezier curve may be employed.

At step S22, the obtained lookup table is stored in the lookup table holding unit 9.

Figure 7:
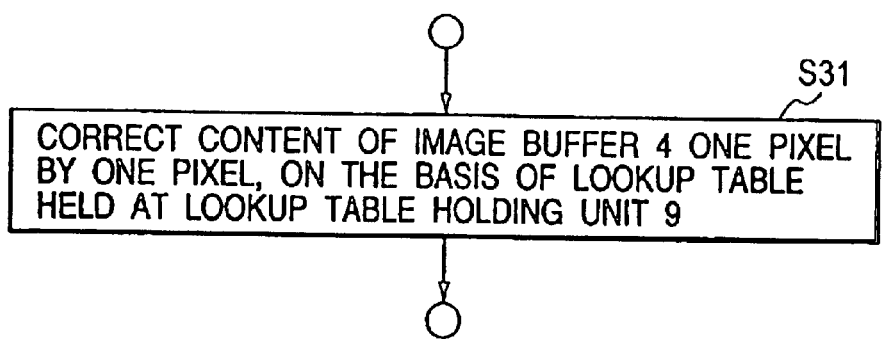
FIG. 7 is a flowchart showing the processing performed by an image correcting unit according to the first embodiment of the present invention.

FIG. 7 is a flowchart showing the processing performed by the image correcting unit 10. This is a detailed diagram of the operation performed at step S13 in FIG. 2.

At step S31, image data for one pixel are read from the image buffer 4 and are corrected by referring to the lookup table held in the lookup table holding unit 9, and are then used to overwrite data recorded in the image buffer 4.

As is described above, for the image correction process performed in this embodiment, tone reproduction and color reproduction are corrected in accordance with the tone reproduction for the output target film.

In this embodiment, a lookup table is prepared for each color component in order to increase the speeds at which the lookup table is prepared and for preparing the lookup table and at which image data is corrected. Furthermore, data concerning gray scales are stored in a profile in order to quickly prepare the lookup table with which both tone reproduction and color reproduction can be preferably corrected. As a result, the gray level that is important for the reproduction of tones can be preferably reproduced by using the gray scales, and the color balance can be corrected.

Figure 11:
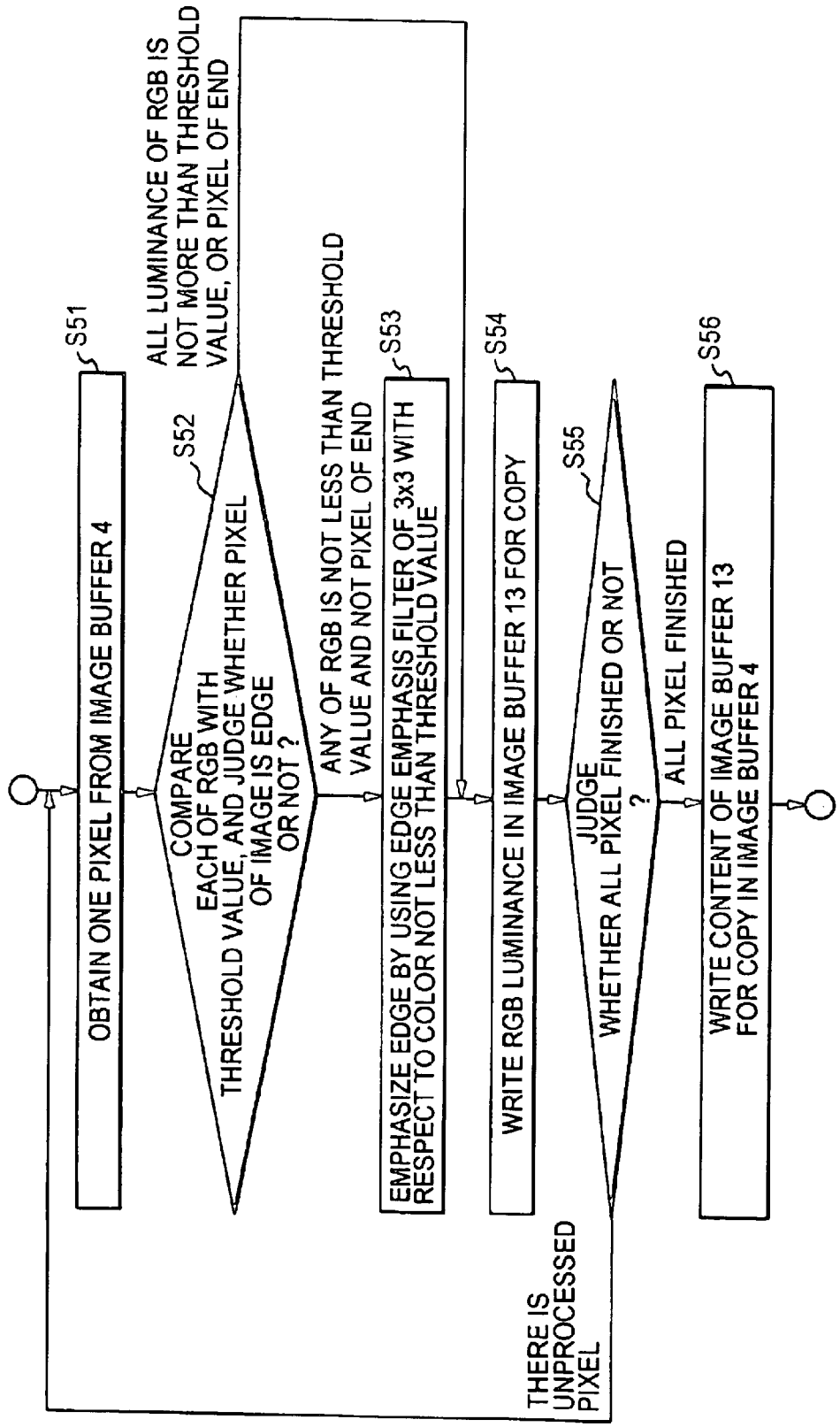
FIG. 11 is a flowchart showing the processing performed by an edge emphasis processing unit.

FIG. 11 is a flowchart showing the processing performed by the edge emphasis processing unit 12. This is a detailed diagram of the operation performed at step S14 in FIG. 2.

When at step S13 an image is corrected by using the lookup table prepared at step S12 in FIG. 2, the colors that are reproduced for an output image can resemble those for the selected film. Generally, however, in a highlighted portion the operation performed at step S13 tends to sacrifice individual color component tones in order to obtain a preferable contrast for these color components in a half-tone portion. Therefore, the edge emphasis processing unit is employed to compensate for the lack of tones in the highlighted portion.

First, at step S51 RGB luminance data for one pixel are read from the image buffer 4.

At step S52, for each RGB pixel the obtained RGB luminance data are compared with a threshold value. When all the RGB luminance data are smaller than the threshold value, or are for pixels at the ends of an image, program control moves to step S54. In the other case, program control goes to step S53.

At step S53, a 3×3 edge emphasis filter is used to filter color component data that are equal to or greater than the threshold value. Color component data that are smaller than the threshold value are not filtered.

At step S54, the obtained RGB luminance data are written in the image buffer 13 for copy. When the edge emphasis processing is not performed, the RGB data fetched at step S51 are written unchanged in the image buffer 13.

At step S55, a check is performed to determine whether all the pixels have been processed. When all the pixels have been processed, program control advances to step S56. When all the pixels have not been processed, program control returns to step S51.

At step S56 all the contents of the image buffer 13 for copy are copied to the image buffer 4.

The threshold value used at step S52 may be the same for all the color components, or may differ for each color component.

Figure 8:
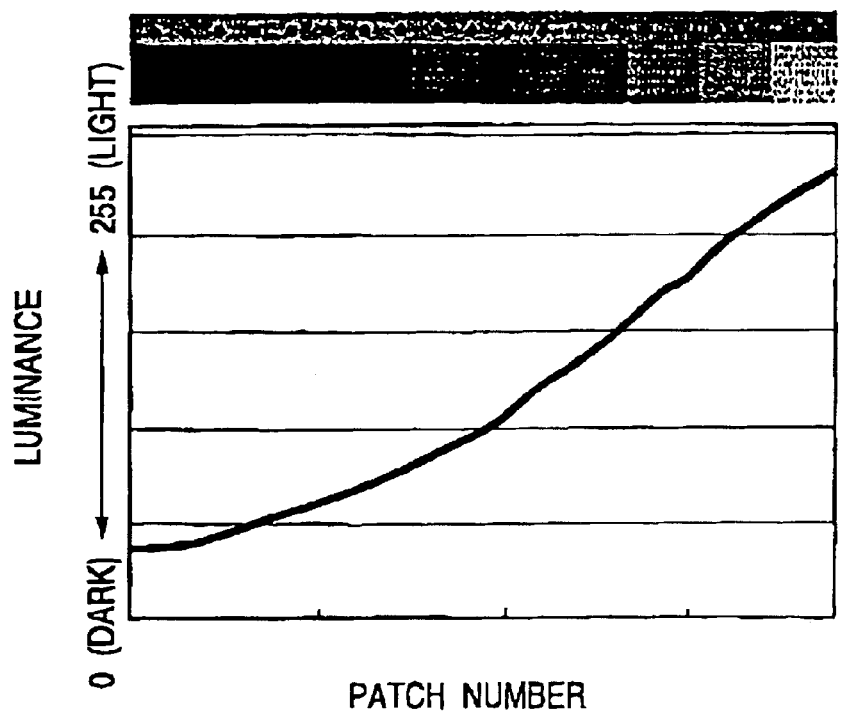
FIG. 8 is a graph showing an example profile for an input device.
Figure 9:
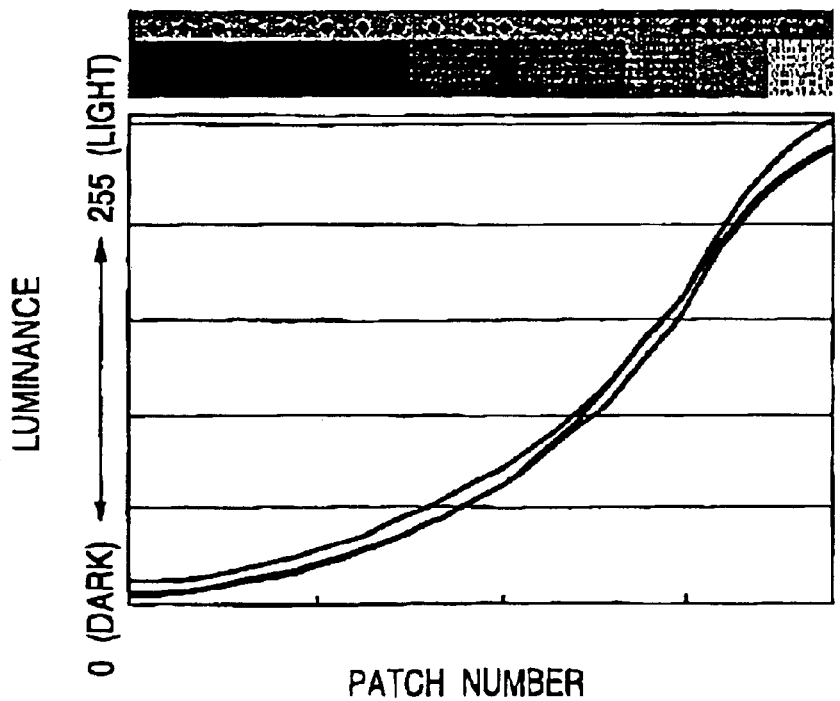
FIG. 9 is a graph showing an example profile for an output film.

According to the first embodiment, an image obtained by a specific input device can resemble an image reproduced using a specific film. For example, a lookup table is prepared with which the tone characteristic for an input device in FIG. 8 is converted into a tone characteristic for a silver halide film shown in FIG. 9, so that an image obtained by a specific device can approximate an image reproduced by using a specific silver halide film. As a result, preferable tone reproduction and desired color reproduction can be easily implemented. The desired color reproduction is a very effective means for enhancing the quality of an image recorded by an input device, such as a digital camera.

Since a plurality of output target film profiles are stored, the characteristics of various films can be coped with. Thus, the tone reproduction and color reproduction desired by a user can be provided.

There are many input device types and also many color shifting methods for obtaining preferable color reproduction. In this embodiment, therefore, an input device profile and an output target film profile are separately stored in order to cope with various combinations of an input device and an output target film. Further, when the number of input device types and the number of output target files are increased, only the profiles of corresponding devices or films need be added.

Since an image obtained by an input device is corrected so that tones and colors of the image are similar to those produced by using a silver halide film, and since edge emphasis processing is performed so as to obtain preferable tones in a highlighted portion, an image having a high quality can be output.

(Second Embodiment)

For image correction in a second embodiment, in addition to the processing explained for the first embodiment, a lookup table is prepared based on a histogram for an input image.

The second embodiment will now be described while referring to the accompanying drawings. No detailed explanation will be given for arrangements and processing that correspond to those in the first embodiment.

Figure 12:
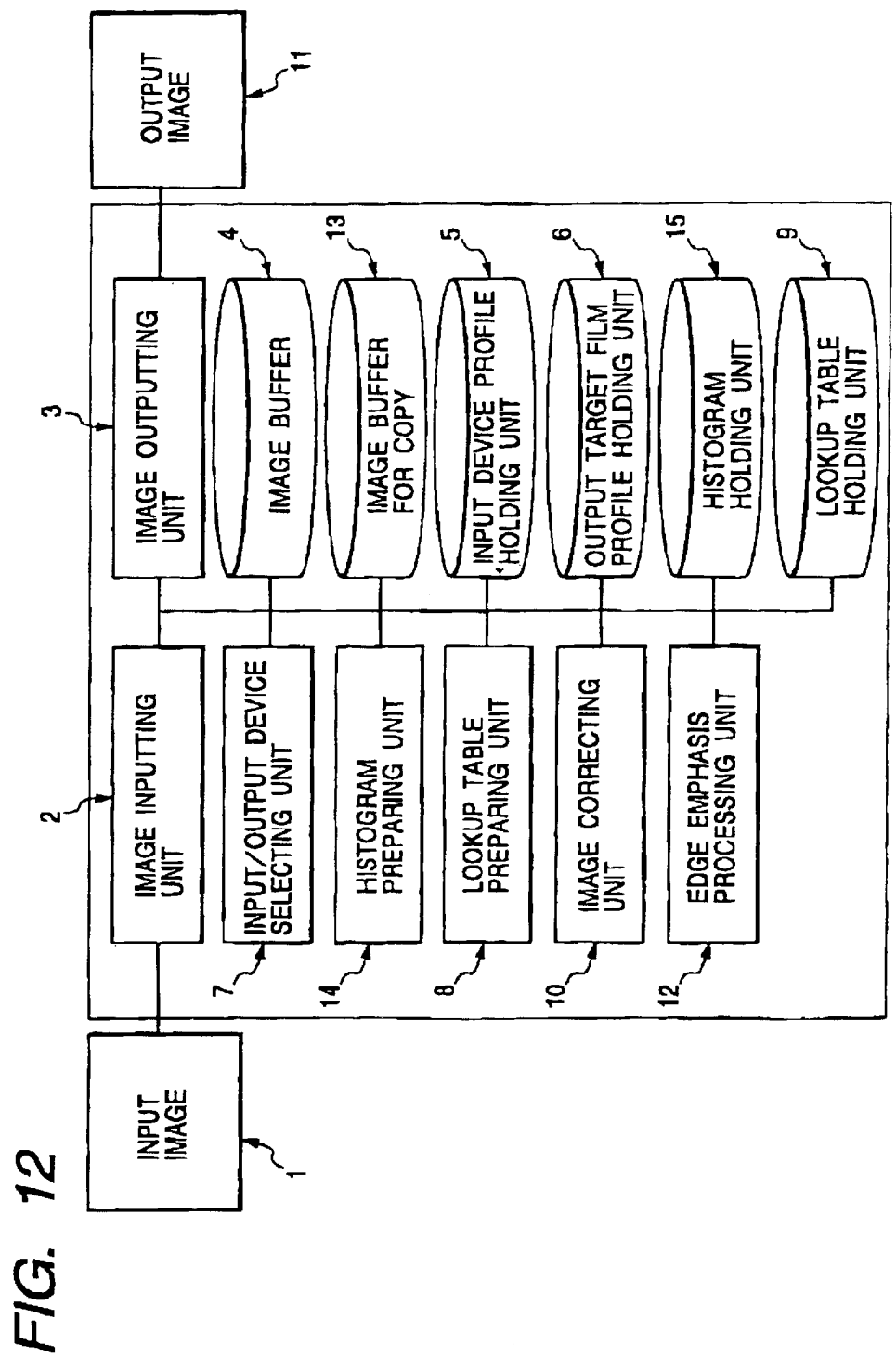
FIG. 12 is a diagram illustrating the arrangement of an image correcting apparatus according to a second embodiment of the present invention.

FIG. 12 is a diagram illustrating the arrangement of the essential portion of an image correction apparatus according to the second embodiment of the present invention.

The image correction apparatus in FIG. 12 comprises: an image inputting unit 2, an image outputting unit 3, an image buffer 4, an input device profile holding unit 5, an output target film profile holding unit 6, an input/output device selecting unit 7, a lookup table preparing unit 8, a lookup table holding unit 9, an image correction unit 10, an edge emphasis processing unit 12, an image buffer 13 for copy, a histogram preparing unit 14, and a histogram holding unit 15.

The image inputting unit 2 fetches data from an input image 1 and writes them in the image buffer 4, and the image outputting unit 3 writes to an output image 11 data written in the image buffer 4, which is used to store image data. The input device profile holding unit 5 holds profiles for several input device types and for an input device that is currently selected. The output target film profile holding unit 6 stores profiles for several output film types and for an output film that is currently selected. The input/output device selecting unit 7 selects an input device and stores its name in the input device profile holding unit 6, and also selects an output target film and stores its name in the output target film profile holding unit 6. Based on a histogram stored in the histogram holding unit 15, the lookup table preparing unit 8 calculates parameters required for correction, and prepares a lookup table and stores it in the lookup table holding unit 9. Also, based on data stored in the input device profile holding unit 5 and the output target film profile holding unit 6, the lookup table preparing unit 8 prepares a lookup table and stores it in the lookup table holding unit 9, which is used to store lookup tables. The image correcting unit 10 synthesizes the two types of tables stored in the lookup table holding unit 9 and corrects an image stored in the image buffer 4. The edge emphasis processing unit 12 emphasizes the edges of a highlighted portion. The image buffer 13 for copy is used to temporarily copy the contents of the image buffer 4 to perform edge emphasis processing. The histogram preparing unit 14 prepares a histogram based on image data stored in the image buffer 4 and stores the histogram in the histogram holding unit 15. The histogram holding unit 15 is used to store the histogram for all the image data.

The image correction apparatus can be implemented by supplying to a personal computer, for example, a program for performing, or for exercising control of the operations of the individual sections in FIG. 12. In this case, the CPU of the personal computer performs, or exercises control of the individual section operations based on the contents of the supplied program.

The processing performed for the second embodiment will now be described in detail by employing a specific example.

<Image Processing in the Second Embodiment>

Figure 13:
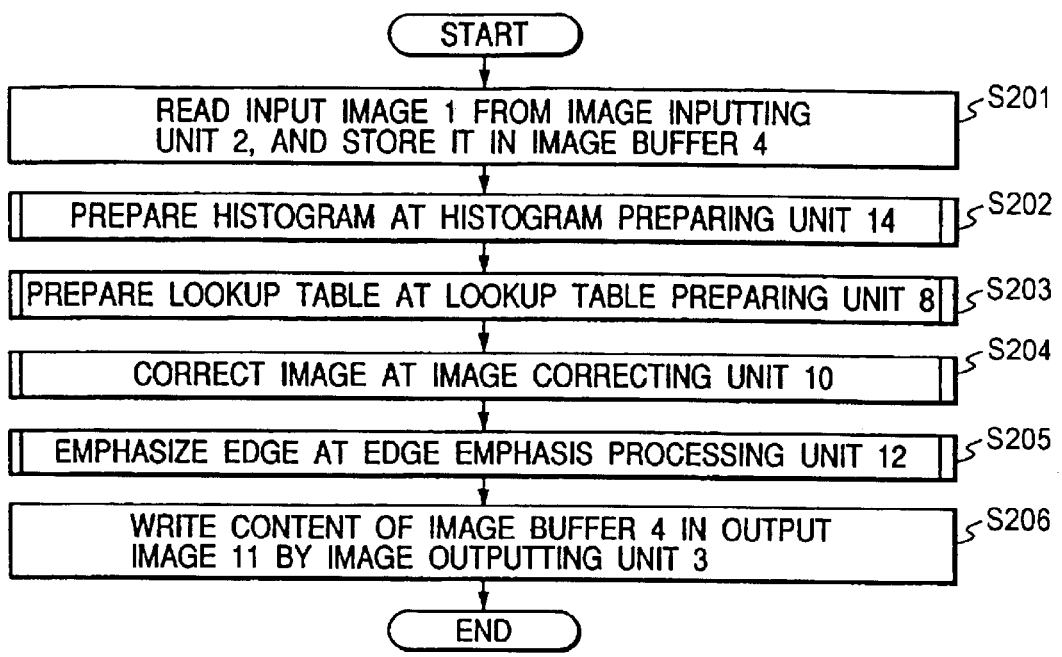
FIG. 13 is a flowchart showing the processing performed for the second embodiment of the present invention.

FIG. 13 is a flowchart showing the processing for the second embodiment.

At step S201, an input image 1 is fetched from the image inputting unit 2, and the image data are stored in the image buffer 4.

At step S202, the histogram preparing unit 14 prepares a histogram based on the image data stored in the image buffer 4, and stores the histogram in the histogram holding unit 15. The detailed operation of the histogram preparing unit 14 will be described later while referring to FIG. 14.

At step S203, the lookup table preparing unit 8 prepares a lookup table. The detailed operation of the lookup table preparing unit 8 will be described later while referring to FIG. 16.

At step S204, the image correcting unit 10 corrects an image. The detailed operation of the image correcting unit 10 will be described later while referring to FIG. 18.

At step S205, the edge emphasis processing unit 12 emphasizes the edges of the highlighted portion in the same manner as described in the first embodiment.

At step S206, the contents of the image buffer 4 are written to the output image buffer 11 by the image outputting unit 3.

<Histogram Preparing Process>

Figure 14:
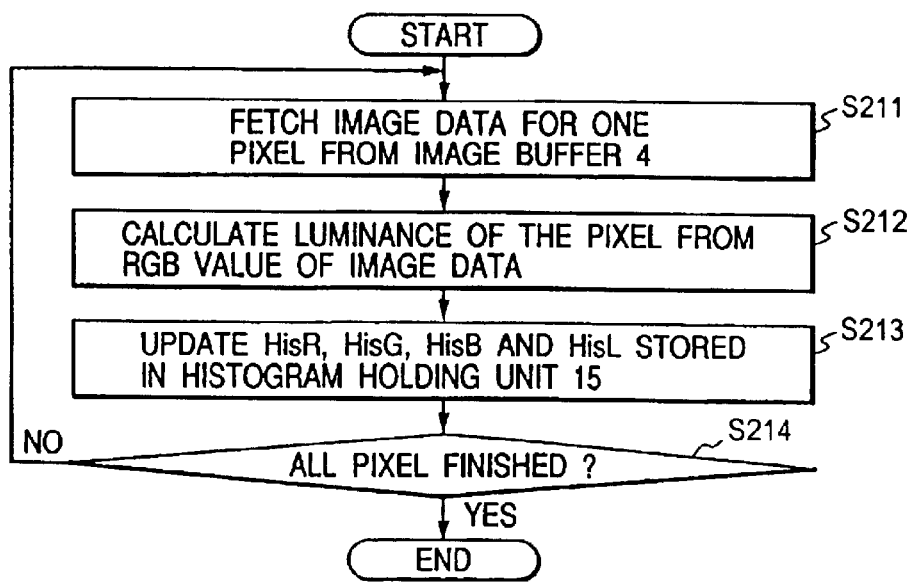
FIG. 14 is a flowchart showing the processing performed by a histogram preparing unit.

The operation performed by the histogram preparing unit 14 is shown in FIG. 14, which is a detailed flowchart of step S202 in FIG. 13.

At step S211, image data for one pixel are extracted from the image buffer 4. The luminance (R, G, B) for each of the RGB color components is stored as image data.

At step S212 the RGB image data values are employed to calculate luminance L for a relevant pixel by using the following equation.

$$L=(3*R+6*G+1*B)/10$$

At step S213, the histogram stored in the histogram holding unit 15 is updated. The histogram holding unit 15 holds histogram HistL for the obtained luminance L, and HistR, HistG and HistB in which the cumulative luminance values of the RGB colors are stored in accordance with the luminance L of the relevant pixel. The histograms are all set to 0 in the initial state.

Updating of the histogram is performed as follows.

HistR[L]=HistR[L]+R

HistG[L]=HistG[L]+G

HistB[L]=HistB[L]+B

HistL[L]=HistL[L]+1

At step S214, a check is performed to determine whether all the pixels have been processed. When all the pixels have been processed, the processing is thereafter terminated. When not all the pixels have been processed, program control returns to step S211.

Figure 15:
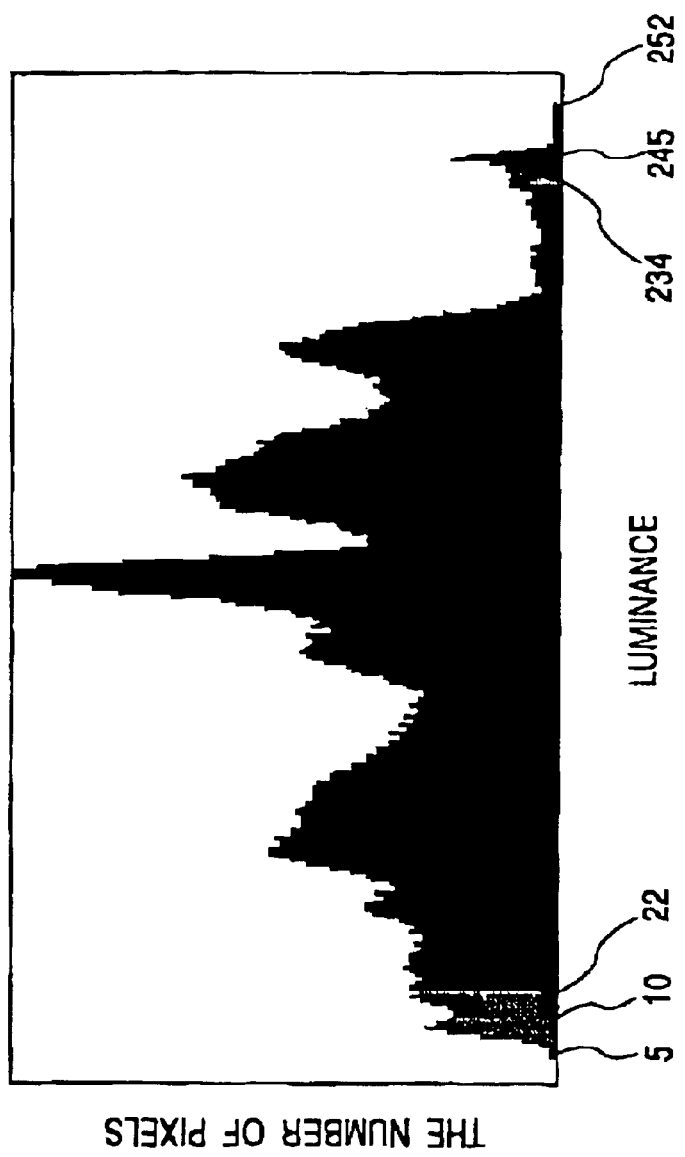
FIG. 15 is a graph showing an example histogram that has been prepared.

The histogram HistL that is prepared is shown in FIG. 15.

<Lookup Table Preparation Process>

Figure 16:
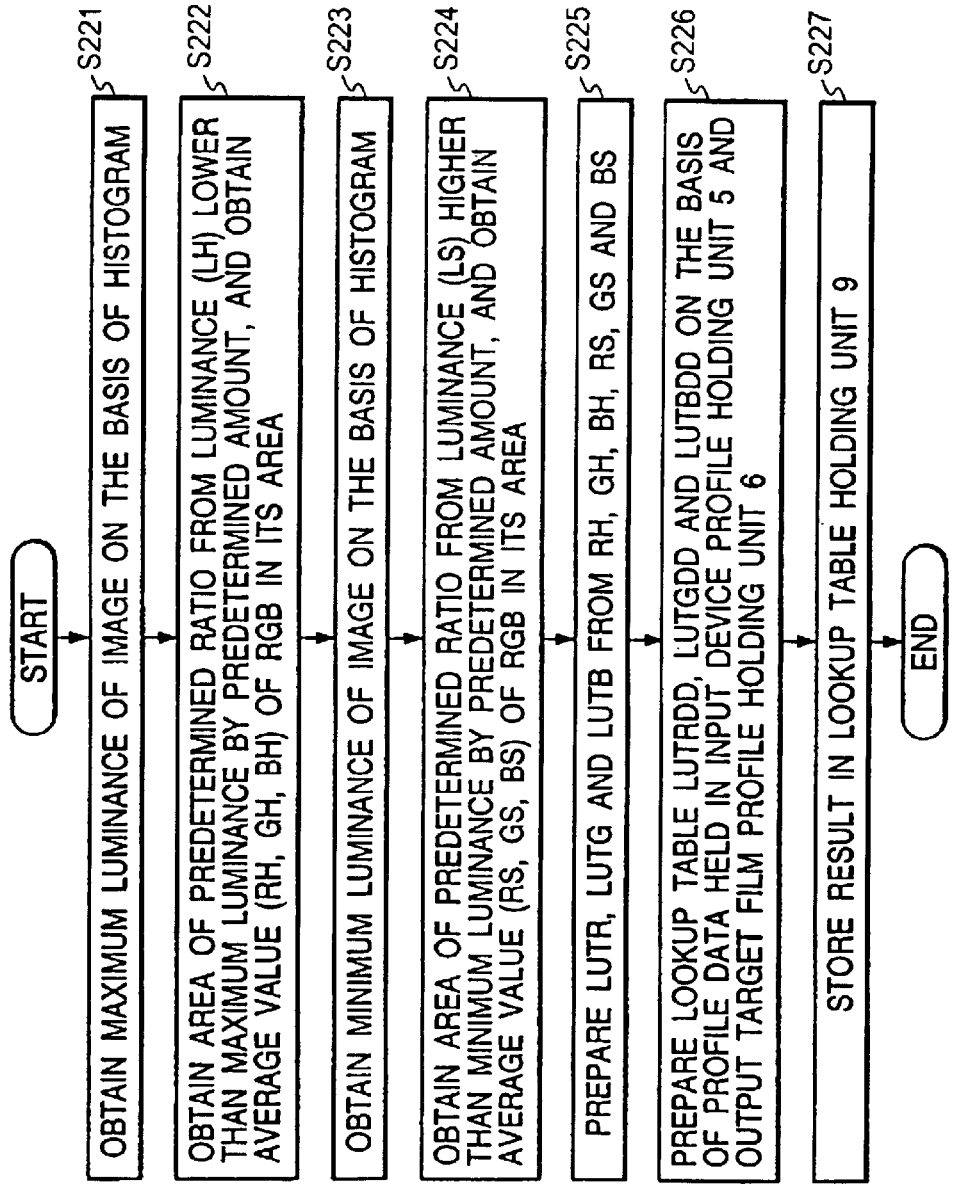
FIG. 16 is a flowchart showing the processing performed by a lookup table preparing unit in FIG. 12.

The operation performed by the lookup table preparing unit 8 is shown in FIG. 16, which is a detailed flowchart for step S203 in FIG. 13.

At step S221, the maximum luminance of an image is obtained from the histogram stored in the histogram holding unit 15. Thus, for the histogram in FIG. 15 the maximum luminance is 252.

At step S222, the luminance LH', obtained by subtracting from 255 a predetermined value (10 in FIG. 15), is compared with the maximum luminance. That is, in this example, the values 255, 245, 235, . . . are obtained by subtraction, and each resultant value is compared with the maximum luminance value. In FIG. 15, LH'=245. When the maximum luminance value is greater than the luminance LH', an area including pixels at a predetermined ratio (in FIG. 15, 1% of the total pixels) is obtained. The minimum luminance in that area is defined as a highlighted point LH (LH=234 in FIG. 15). The average luminance (RH, GH, BH) of RGB in an area wherein the luminance is equal to or higher than LH and equal to or lower than LH' is calculated by using the following equations.

$$RH = \sum_{m=LH}^{LH'} HistR[m] / \sum_{m=LH}^{LH'} HistL[m]$$

$$GH = \sum_{m=LH}^{LH'} HistG[m] / \sum_{m=LH}^{LH'} HistL[m]$$

$$BH = \sum_{m=LH}^{LH'} HistB[m] / \sum_{m=LH}^{LH'} HistL[m]$$

At step S223, the minimum luminance level of an image is obtained from the histogram HistL stored in the histogram holding unit 4. The minimum luminance is 5, according to the histogram in FIG. 15.

At step S224, a predetermined value (10 in FIG. 15) is added to the luminance level, beginning with 0, and the resultant value LS' is compared with the minimum luminance level obtained at step S223. When the minimum luminance is smaller than the luminance LS' (10 in FIG. 15), an area including pixels at a predetermined ratio (in FIG. 15, 1% of the total pixels) is acquired. The maximum luminance in that area is defined as a shadow point LS (LS=22 in FIG. 15). The average luminance (RS, GS, BS) of RGB in an area wherein the luminance is equal to or higher than LS' and equal to or lower than LS is calculated by using the following equations.

$$RS = \sum_{m=LS'}^{LS} HistR[m] / \sum_{m=LS'}^{LS} HistL[m]$$

$$GS = \sum_{m=LS'}^{LS} HistG[m] / \sum_{m=LS'}^{LS} HistL[m]$$

$$BS = \sum_{m=LS'}^{LS} HistB[m] / \sum_{m=LS'}^{LS} HistL[m]$$

Figure 17A:
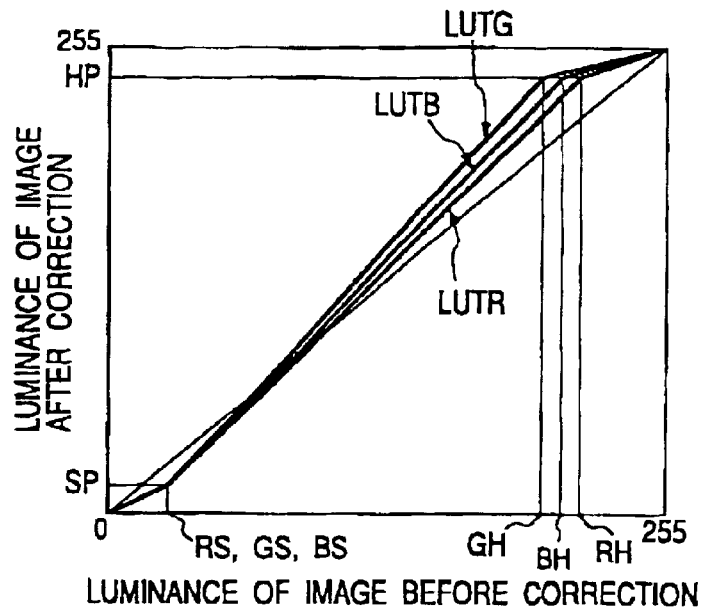
FIGS. 17A and 17B are diagrams showing example lookup tables held in a lookup table holding unit in FIG. 12.

At step S225, lookup tables LUTR, LUTG and LUTB for individual RGB values are prepared by using the obtained RH, GH, BH, RS, GS and BS. The thus prepared lookup tables, for which a detailed explanation will be given later, are shown in FIG. 17A. These tables are stored in the lookup table holding unit 9.

At step S226, based on the profiles selected for the input device and the output target film by the input/output device selecting unit 7, one-dimensional lookup tables LUTRDD, LUTGDD and LUTBDD are prepared for individual RGB color components in the same manner as in the first embodiment. The thus prepared lookup tables, for which an explanation will be given later, are shown in FIG. 17B.

At step S227, the obtained lookup tables are stored in the lookup table holding unit 9.

The lookup tables LUTR, LUTG and LUTB, shown in FIG. 17A, are used to correct the color contrast and for the assimilation of color. In this embodiment, gamma for highlighting is set in the descending order G, B and R. Since G and B are exaggerated relative to R, the assimilation of color (color fog) of an image that appears bluish can be corrected. At the same time, the color contrast can be corrected.

Figure 17B:
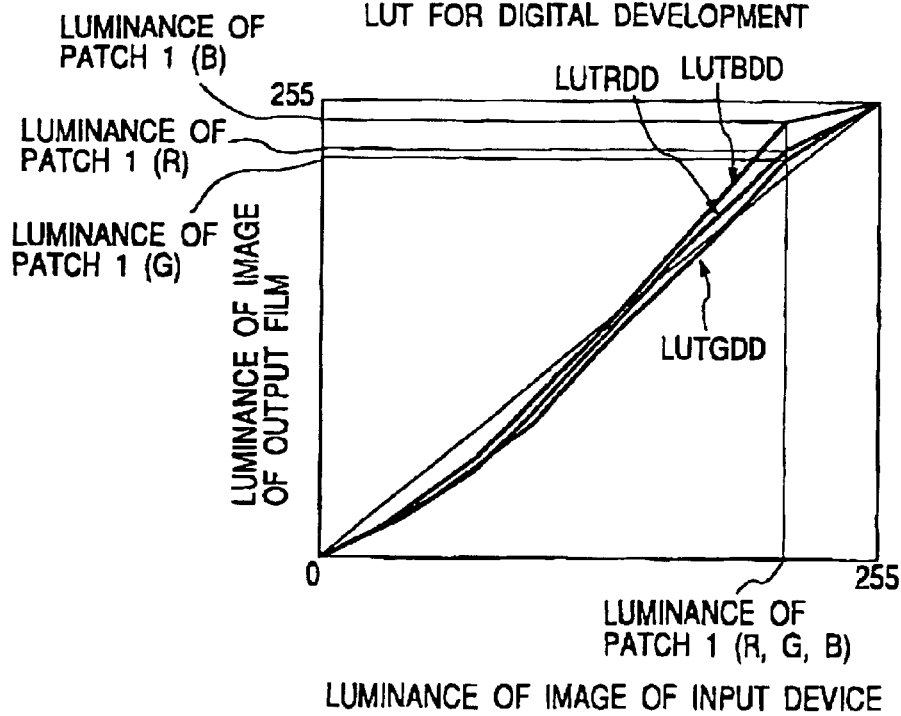

The lookup table in FIG. 17B is the table with which data from the input device profile corresponding to the same patch are converted into data for the output target film profile. The points for which no data are stored in the profile are linearly interpolated and conversion data are prepared. At both ends, points (255, 255) and (0, 0) are linearly interpolated. While linear interpolation is employed in this embodiment, non-linear interpolation using a spline curve or a Bezier curve, for example, may be employed.

<Image Correction Process>

Figure 18:
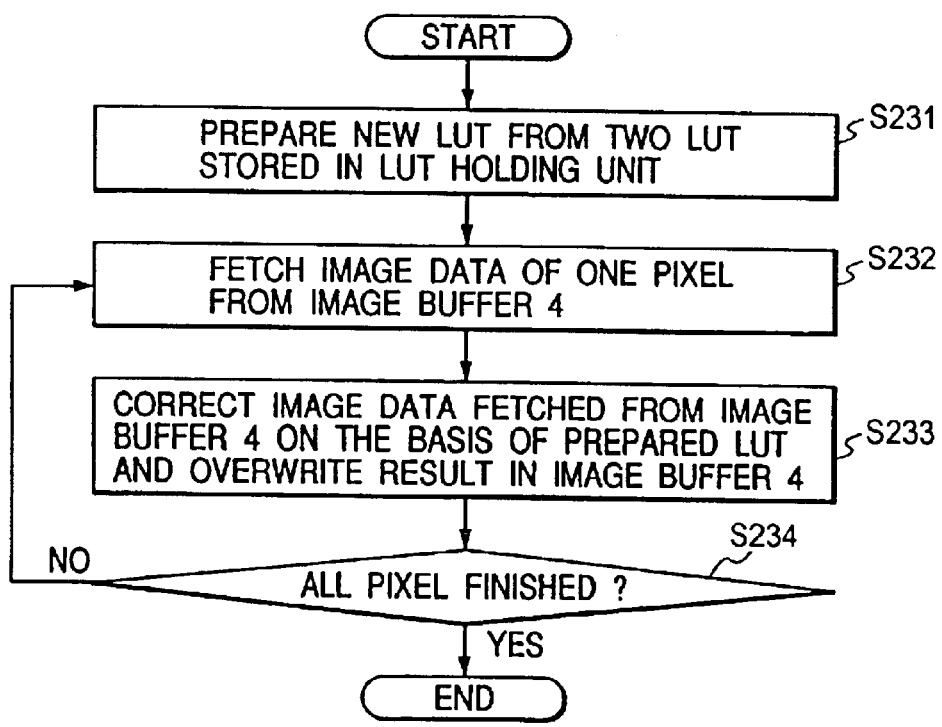
FIG. 18 is a flowchart showing the processing performed by an image correcting unit according to the second embodiment of the present invention.

The processing performed by the image correcting unit 10 is shown in FIG. 18, which is a detailed flowchart for step S204 in FIG. 13.

At step S231 new lookup tables are prepared by synthesizing the two types of lookup tables stored in the lookup table holding unit 9 using the following equations.

$$LUTTmpR[i]=LUTRDD[LUTR[i]]$$

$$LUTTmpG[i]=LUTGDD[LUTG[i]]$$

$$LUTTmpB[i]=LUTBDD[LUTB[i]]$$

In these equations, i is a value that is equal to or greater than 0, and is equal to or smaller than the maximum luminance value.

At step S232, image data for one pixel is extracted from the image buffer 4. Individual RGB luminance values (R, G, B) are stored as image data.

At step S233, the image data extracted from the image buffer 4 are corrected based on the obtained lookup tables LUTRTmp, LUTGTmp and LUTBTmp, and the resultant image data are used to overwrite the original location.

$$R=LUTTmpR[R]$$

$$G=LUTTmpG[G]$$

$$B=LUTTmpB[B]$$

At step S234, a check is performed to determine whether image data for all the pixels have been corrected. When the correction process has been completed for all the pixels, the processing is thereafter terminated. When the correction process has not been completed for all the pixels, program control returns to step S232.

As is described above, in the image processing for this embodiment, optimal correction provided for white balance and for color contrast is performed for each image, and tone reproduction and color reproduction are corrected in accordance with the tone reproduction characteristics of the output target film.

In this embodiment, a lookup table is prepared for each color component in order to increase the speeds for the preparation of a lookup table and for image correction. In addition, data concerning a gray scale is stored in a profile, so that a lookup table can be quickly prepared with which both tone reproduction and color reproduction can be preferably corrected. By employing the gray scale, the gray level that is important for tone reproduction can be preferably reproduced, and color balance can be corrected.

In this embodiment, digital values of 0 to 255 are employed to describe luminance data; however, the maximum data value is not limited to 255, and instead of the luminance value, printing dot density may be employed.

Further, at step S212 the luminance value is calculated by weighting the luminance value at a ratio of R:G:B=3:6:1; however, other weighting may be employed for the calculation, or the average of a maximum RGB value and a minimum RGB value may be employed.

(Third Embodiment)

In a third embodiment, an image correction process is changed in accordance with whether an input device is a digital camera.

Since correction for color assimilation and contrast based on the histogram explained in the second embodiment is a process employing the distribution of colors for an input image, regardless of the input device, preferable results can be obtained. However, since the digital development correction as explained in the first and the second embodiments is a process for adjusting the tone characteristics of an output image to conform to the tone characteristics of an arbitrary film, the quality of an output image may be deteriorated if the input image has the tone characteristics of the relevant film. In other words, digital development may not be good for a silver halide image that is read by a scanner, or an image that is read by a film scanner.

Therefore, in this embodiment, when an input device is a digital camera, the same process as in the second embodiment is performed, and when the input device is not a digital camera, only the correction of color assimilation and contrast is performed; digital development correction is not performed.

No detailed explanation will be given for arrangements and processing that correspond to those in the first and the second embodiments.

Figure 19:
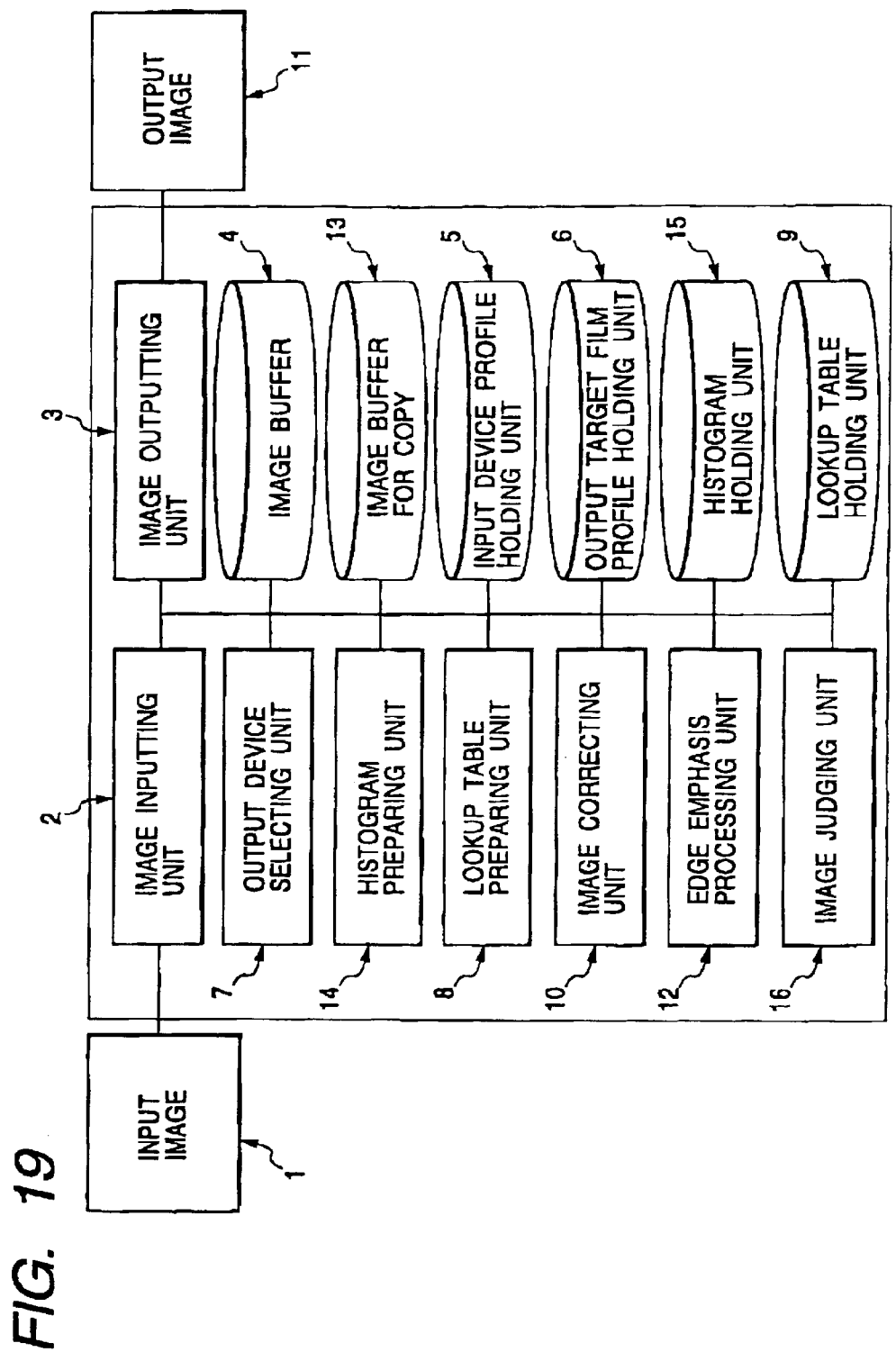
FIG. 19 is a diagram illustrating the arrangement of an image correcting apparatus according to a third embodiment of the present invention.

FIG. 19 is a diagram showing the arrangement of the essential portion of an image correction apparatus according to the third embodiment.

The image correction apparatus in FIG. 19 comprises: an image inputting unit 2, an image outputting unit 3, an image buffer 4, an input device profile holding unit 5, an output target film profile holding unit 6, an output device selecting unit 7, a lookup table preparing unit 8, a lookup table holding unit 9, an image correcting unit 10, an edge emphasis processing unit 12, an image buffer 13 for copy, a histogram preparing unit 14, a histogram holding unit 15, and an image judging unit 16.

The image inputting unit 2 fetches data from an input image 1, and writes them in the image buffer 4. The image outputting unit 3 writes data stored in the image buffer 4 to an output image 11. The image buffer 4 is used to store image data. The input device profile holding unit 5 holds profiles for several input device types and for an input device that is currently selected. The output target film profile holding unit 6 stores profiles for several output film types and for an output film that is currently selected. The output device selecting unit 7 also selects an output target film and stores its name in the output target film profile holding unit 6. Based on a histogram stored in the histogram holding unit 15, the lookup table preparing unit 8 calculates parameters required for correction, and prepares a lookup table and stores it in the lookup table holding unit 9. Also, when an input device is a digital camera, based on data stored in the input device profile holding unit 5 and the output target film profile holding unit 6, the lookup table preparing unit 8 prepares a lookup table and stores it in the lookup table holding unit 9, which is used for the storage of lookup tables. The image correcting unit 10 corrects an image stored in the image buffer 4 based on the lookup table stored in the lookup table holding unit 9. The edge emphasis processing unit 12 emphasizes the edges of a highlighted portion. The image buffer 13 for copy is used to temporarily hold a copy of the contents of the image buffer 4 when edge emphasis processing is performed. The histogram preparing unit 14 prepares a histogram based on image data stored in the image buffer 4, and stores the histogram in the histogram holding unit 15. The histogram holding unit 15 is used to store the histogram for all the image data. The image judging unit 16 determines what type of image is being processed.

An image correction apparatus can be implemented by supplying to a personal computer, for example, a program for performing, or for exercising control of the operations of the individual sections in FIG. 19. In this case, the CPU of the personal computer performs, or exercises control of the individual section operations based on the contents of the supplied program.

The third embodiment will now be described in detail by employing a specific example.

Figure 20:
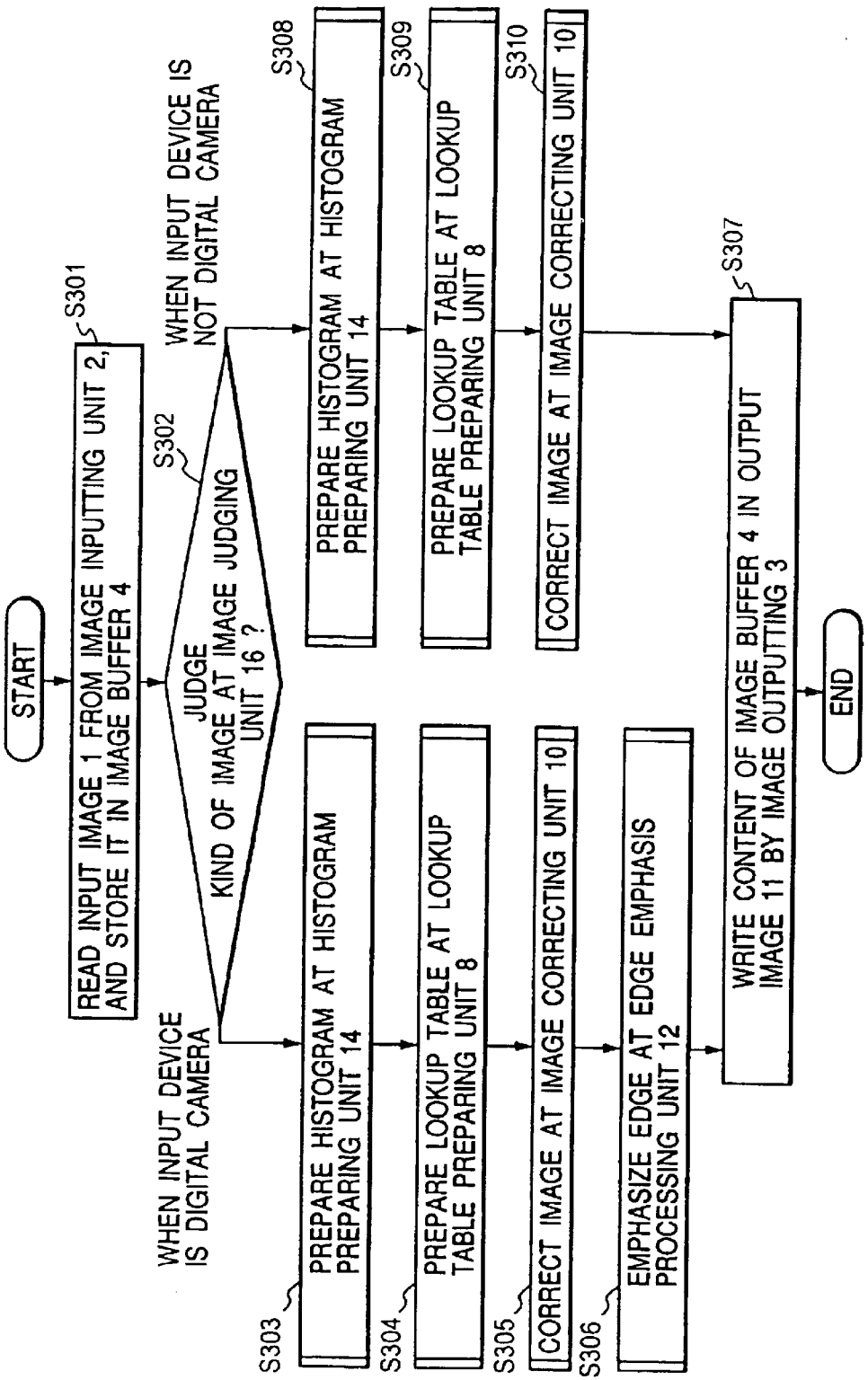
FIG. 20 is a flowchart showing the processing performed for the third embodiment of the present invention.

FIG. 20 is a flowchart showing the processing performed for the third embodiment.

At step S301, image data for an input image 1 and an image header are read by the image inputting unit 2, and are stored in the image buffer 4.

At step S302, the image judging unit 16 determines the image type. Specifically, the image judging unit 16 employs an ID entered in the image header to determine whether the input device used for the image was a digital camera or another device.

FIG. 21 is a diagram showing the contents of the image data and the image header stored in the image buffer 4.

The ID of the input device is included with the image data, which represent the RGB values of individual pixels, and the image judging unit 16 examines the ID to determine the type of input device, which may be, for example, a digital camera, a file scanner, or a flat bed scanner. An input device profile is automatically selected in accordance with the input device ID stored in the image header.

When, at step S302, it is ascertained that the input device is a digital camera, program control moves to step S303. When the input device is a device other than a digital camera, program control goes to step S308.

At step S303, the histogram preparing unit 14 prepares a histogram based on the image data stored in the image buffer 4 and stores it in the histogram holding unit 15.

At step S304, the lookup table preparing unit 8 prepares a lookup table.

At step S305, the image correcting unit 10 corrects an image.

At step S306, the edge emphasis processing unit 12 emphasizes the edges of a highlighted portion.

The processes at steps S303 to S306 are the same as those at steps S202 to S205 in FIG. 13 that were explained in the second embodiment.

At step S307, the data in the image buffer 4 are written by the image outputting unit 3 to an output image 11.

At step S308, the histogram preparing unit 14 prepares a histogram based on the image data stored in the image buffer 4 and stores it in the histogram holding unit 15. This process is the same as the one performed at step S303.

At step S309, the lookup table preparing unit 8 prepares a lookup table.

Figure 22:
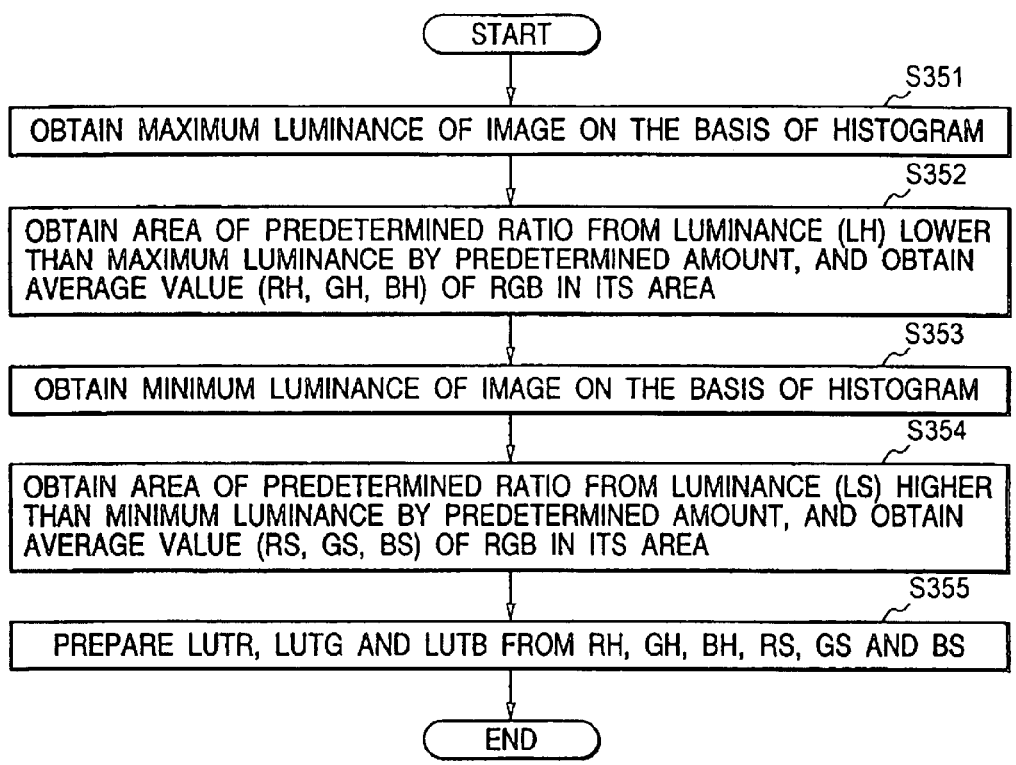
FIG. 22 is a flowchart showing the processing performed by a lookup table preparing unit when an input device is other than a digital camera.

The operation of the lookup table preparing unit 8 when the input device is a digital camera is shown in FIG. 22. The processes at steps S351 to S355 are the same as those at steps S221 to S225 in FIG. 16 that were explained in the second embodiment.

At step S310, the image correcting unit 10 corrects an image. This process is the same as the one performed at step S305.

<Process for Changing a Selected Profile>

Figure 23:
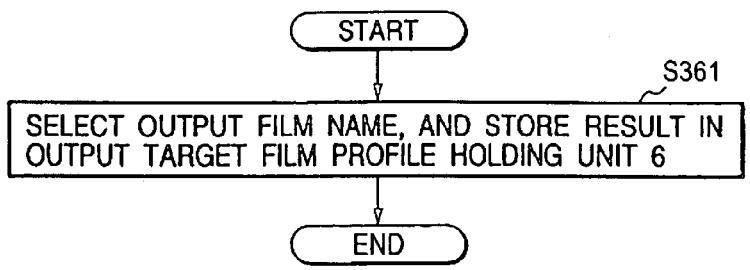
FIG. 23 is a flowchart showing the processing performed by an output device selecting unit.

The operation of the output device selecting unit 7 is shown in FIG. 23.

At step S361, the name of an output film is selected and is stored in the output target film profile holding unit 6. The name of an output device is selected as the name of an output film in accordance with an instruction that is entered by a user at a user interface that is unique to the image correction apparatus of the present invention.

The selection of the output film name can be performed any time except during the correction process.

In this embodiment, the input device is automatically selected in accordance with the ID of the input device that is stored in the image header of the image data. However, a user may manually select the input device.

(Other Embodiments)

In addition, the scope of the present invention may also include an embodiment wherein software program code for accomplishing the functions of the embodiments is loaded into a computer (a CPU or an MPU) in an apparatus, or in a system, that is connected to various devices in order to operate them, so that the devices are operated by the computer in the system, or in the apparatus, in accordance with the stored program.

In this case, the program code implements the innovative functions provided by the present invention, and the means for supplying the program code to the computer, e.g., the memory medium on which the program code is stored, accomplishes the present invention.

A memory medium on which the program code is recorded is, for example, a floppy disk, a hard disk, an optical disk, a magneto optical disk, a CD-ROM, a magnetic tape, a nonvolatile memory card, or a ROM.

Another embodiment of the present invention consists of an application wherein, to accomplish the functions of the above embodiments, not only does a computer execute program code that is supplied, but in addition, the program code interacts either with an OS (Operating System) that is running on the computer or with another software program.

Furthermore, to accomplish the functions included in the above embodiment, the present invention also provides for program code to be stored in memory mounted on a function expansion board in a computer, or in memory mounted in a function expansion unit connected to the computer, and for, in consonance with instructions included in the program code, a CPU mounted on the function extension board or mounted in the function extension unit to perform a part or all of the processing.

Although the present invention has been described in its preferred form with a certain degree of particularity, many apparently widely different embodiments can be devised without departing from the spirit and the scope of the invention. It is therefore to be understood that the invention is not limited to specific embodiments described herein, except as defined in the appended claims.

What is claimed is:

1. An image processing method comprising the steps of:

holding a profile corresponding to a kind of input device and a profile corresponding to a kind of output target film, each profile including color data according to plural gray patches;

inputting input image data depending on the input device;

selecting the profile corresponding to the kind of input device and the profile corresponding to the kind of output target film;

generating plural tables respectively corresponding to the plural color components of the input image data, based on the selected profile corresponding to the kind of input device and the selected profile corresponding to the kind of output target film; and correcting a color of the input image data using the generated table, wherein said table is used to convert first color data in the selected profile corresponding to the kind of input device into second color data, corresponding to a gray patch that is the same as the first color data, in the selected profile corresponding to the kind of output target film.

2. An image processing method according to claim 1, further comprising the step of:

emphasizing an edge in a highlighted portion of the color-corrected image data.

3. An image processing method according to claim 1, further comprising the steps of:

performing a white balance correction using a look up table prepared on the basis of a highlighted point and a shadow point of the input image data; and performing the color correction for the image data obtained by the white balance correction.

4. An image processing method according to claim 1, further comprising the steps of:

judging a type of an input device type according to an input image; and determining, in accordance with a result obtained in said judging step, whether the color correction is to be performed.

5. An image processing method according to claim 4, wherein the type of the input device is described as an ID, within header information for the input image.

6. An image processing method according to claim 4, wherein the type of the input device is the name of a digital camera, a film scanner or a flat bed scanner.

7. An image processing method according to claim 6, wherein the color correction is performed when the type of the input device is a digital camera.

8. An image processing method according to claim 7, where, when the input device type is a digital camera, the profile for the input device is automatically selected in accordance with the name of the device.

9. An image processing apparatus comprising:

holding means for holding a profile corresponding to a kind of input device and a profile corresponding to a kind of output target film, each profile including color data according to plural gray patches;

input means for inputting input image data depending on the input device:

selection means for selecting the profile corresponding to the kind of input device and the kind of profile corresponding to the kind of output target film;

generating means for generating plural tables respectively corresponding to plural color components of the input image data, based on the selected profile corresponding to the kind of input device and the selected profile corresponding to the kind of output target film; and color correction means for correcting the color of the input image data using the generated table;

wherein said table is used to convert first color data in the selected profile corresponding to the kind of input device into second color data, corresponding to a gray patch that is the same as the first color data, in the selected profile corresponding to the kind of output target film.

10. A recording medium on which an image processing program is stored, said program comprising the steps of:

holding a profile corresponding to a kind of input device and a profile corresponding to a kind of output target film, each profile including color data according to plural gray patches;

inputting input image data depending of the input device;

selecting the profile corresponding to the kind of input device and the profile corresponding to the kind of output target film;

generating plural tables respectively corresponding to plural color components of the input image data, based on the selected profile corresponding to the kind of input device and the selected profile corresponding to the kind of output target film; and correcting the color of the input image data using the generated table, wherein said table is used to convert first color data in the selected profile corresponding to the kind of input device into second color data, corresponding to a gray patch that is the same as the first color data, in the selected profile corresponding to the kind of output target film.

* * * * *

UNITED STATES PATENT AND TRADEMARK OFFICE
CERTIFICATE OF CORRECTION

PATENT NO. : 6,853,747 B1
APPLICATION NO. : 09/317844
DATED : February 8, 2005
INVENTOR(S) : Takahiro Matsuura et al.

It is certified that error appears in the above-identified patent and that said Letters Patent is hereby corrected as shown below:

SHEET 9 of 19:
Figure 11, "ALL PIXEL" (both occurrences) should read --ALL PIXELS--.

SHEET 11 of 19:
Figure 14, "ALL PIXEL" should read --ALL PIXELS--.

SHEET 15 of 19:
Figure 18, "ALL PIXEL" should read --ALL PIXELS--.

COLUMN 3:
Line 27, "temporarily" should read --temporary--.

COLUMN 14:
Line 2, "where," should read --wherein,--.
Line 11, "device:" should read --device;--.
Line 22, "table;" should read --table,--.

Signed and Sealed this

Twenty-fourth Day of April, 2007

JON W. DUDAS
*Director of the United States Patent and Trademark Office*